Figure 1:
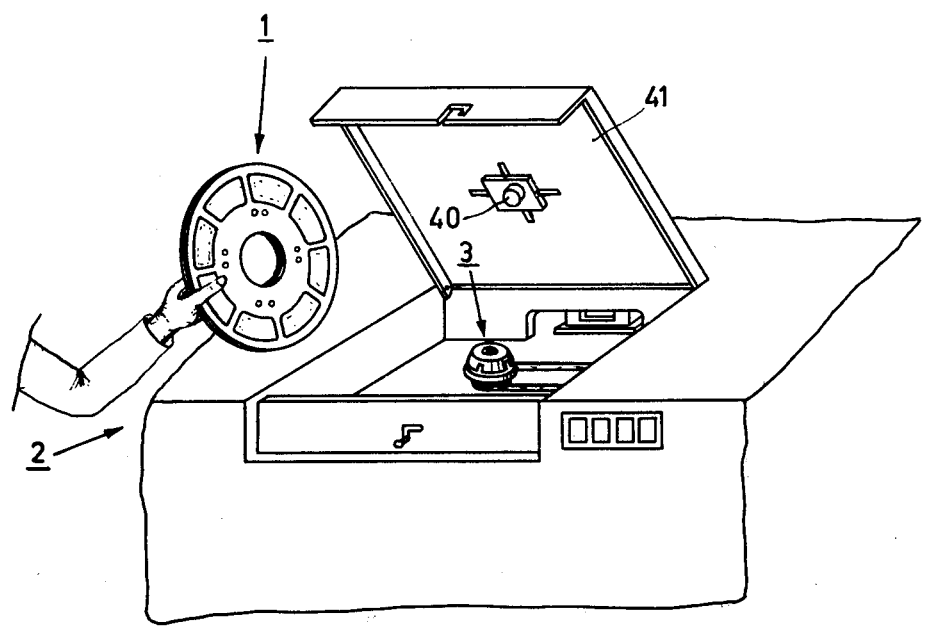

United States Patent [19]

Kok

[11] 4,068,271
[45] Jan. 10, 1978

[54] INTERCHANGEABLE MAGNETIC STORAGE ELEMENT

[75] Inventor: Cornelis Hendrik Kok, Wassenaar, Netherlands

[73] Assignee: U.S. Philips Corporation, New York, N.Y.

[21] Appl. No.: 630,989

[22] Filed: Nov. 12, 1975

[30] Foreign Application Priority Data

Nov. 22, 1974 Netherlands .................... 7415238

[51] Int. Cl.$^2$ .................... G11B 25/04; G11B 23/02
[52] U.S. Cl. .................... 360/97; 346/137; 360/133
[58] Field of Search .................... 360/97, 98, 99, 133; 206/444; 346/137

[56] References Cited

U.S. PATENT DOCUMENTS

| | | | |
|---|---|---|---|
| 3,715,739 | 2/1973 | Van Acker | 360/97 |
| 3,770,908 | 11/1973 | Craggs | 360/97 |
| 3,772,665 | 11/1973 | Hertrich | 360/97 |
| 3,899,794 | 8/1975 | Brown, Jr. | 360/97 |

Primary Examiner—Daryl W. Cook
Attorney, Agent, or Firm—Frank R. Trifari; Steven R. Biren

[57] ABSTRACT

An interchangeable random-access magnetic storage element, comprising an electromagnetic disk disposed in a substantially cylindrical dust-proof enclosure, which as an assembly can be fitted onto a drive spindle of a drive means. The enclosure comprises two covers which are clamped against each other with the insertion of dust seals, which together with the magnetic disk are rotated by the drive spindle, the upper cover being axially lifted by lifting cams provided on the drive spindle, so that an annular slot is obtained between the lower and upper cover for the passage of electromagnetic recording and reproducing means. At its top the drive spindle comprises an axially movable pressure member, which upon closure of a cover of the drive means is depressed and thus clamps the electromagnetic disk onto the spindle and simultaneously lifts the upper cover.

7 Claims, 6 Drawing Figures

INTERCHANGEABLE MAGNETIC STORAGE ELEMENT

The invention relates to an interchangeable random-access magnetic storage element adapted to be fitted onto a drive spindle of a drive means and comprising a substantially cylindrical dust-proof enclosure with a lower and an upper surface disposed at some distance from each other, a single magnetic disk which is rotatably drivable by the drive means and accommodated in the enclosure, means for positioning the storage element on the drive means, a passage through which electromagnetic recording and/or read means can be passed, means for the automatic closure of the passage each time that the storage element is removed from the drive means, as well as means for preventing a rotation of the magnetic disk relative to the enclosure each time that the storage element is removed from the drive means.

Such a storage element is known from U.S. Pat. No. 3,526,884. When the storage element is positioned on a drive means a part of the enclosure, in the form of a cover which is hingeably disposed in the upper surface is opened, so that a substantially diametrically extending slot in the upper surface of the enclosure is exposed, which serves as a passage for the electromagnetic recording and read means. Said means comprise one or more electromagnetic head which during operation approach the magnetic disk very closely. The enclosure is stationary and fixed in the drive means, so that when it is driven the magnetic disk rotates in a stationary enclosure. In order to prevent the temperature of the magnetic disk from becoming excessively high, the lower surface of the enclosure has a vent opening which can be closed by means of a plate valve. Each time that the storage element is fitted onto the drive means, the plate valve is pressed upwards by a pin provided on the drive means so as to provide the necessary ventilation.

The known storage element has a number of drawbacks; for example the housing is comparatively complicated. It has a cover which is hingeably disposed in the upper surface for closing the passage for the electromagnetic heads and, in addition, a vent opening closed by a plate valve. Furthermore, means are provided which press the magnetic disk against the lower surface of the enclosure when the valve in the upper surface is closed, because otherwise the magnetic disk could move relative to the enclosure and dust might penetrate through the space which then exists between the disk and the enclosure. Furthermore, the enclosure must be provided with means which cooperate with the drive means in view of the required stationary fixation. Moreover, ventilation also presents problems in the known storage elements. As the enclosure is stationary whilst the magnetic disk rotates, the air present in the enclosure exhibits little tendency to circulate. Therefore means have to be provided to generate an air flow which moves via the passage and the vent opening. Another drawback is that the storage element may be fitted onto the drive means in one specific position only.

It is an object of the invention to provide a magnetic storage element which combines a simple and inexpensive enclosure with small dimensions and ease of handling, while excellent ventilation is assured even at the highest possible speeds. The invention is characterized in that the enclosure comprises lower and upper covers, which are axially movable relative to each other, wherein the passage for the magnetic recording and/or read means takes the form of an annular slot which is formed upon a relative axial movement between the upper and the lower cover, and wherein furthermore means are provided which also prevent a rotation of the magnetic disk relative to the enclosure each time that the storage element is fitted onto the drive means, so that the enclosure and the magnetic disk are jointly drivable in a rotatable fashion by the drive means.

It is advantageous when the two covers comprise identical plastic shells. Furthermore, it is advantageous if the covers near their circumference comprise first annular dust seals which when the enclosure is closed engage with each other and are further provided with second annular dust seals nearer their center, which seals when the enclosure is closed engage with the magnetic disk.

One embodiment of the invention is characterized in that said means for closing the passage for the electromagnetic recording and/or read means comprise a number of leaf springs bent out of their neutral positions, which nearer the center of the storage element are both rigidly connected to the magnetic disk and to a cover, and press these covers towards each other.

In a magnetic storage element according to the invention in which the magnetic disk consists of a round disk provided with a magnetizable coating, which disk is rigidly connected to a hub which is adapted to cooperate with the drive spindle of the drive means, it is advantageous when the inner surface of the hub which faces the center of the storage element has a substantially continuous cylindrical shape.

The invention also includes a drive means which is intended for driving storage elements according to the invention. The drive means is characterized in that the drive spindle comprises a number of movable clamping members for tightly retaining and thus driving the magnetic disk, as well as a number of movable lifting members for axially lifting a cover. In this respect it is advantageous if the drive spindle comprises a pressure member at its top which is axially depressable against spring pressure, which member upon depression moves said clamping members and lifting members and furthermore if the drive means comprises a cover which is movable between an open and a closed position, the depression of the pressure member being effected when the cover is moved from the open position to the closed position by means of parts of the cover which cooperate with the pressure member.

Figure 2:
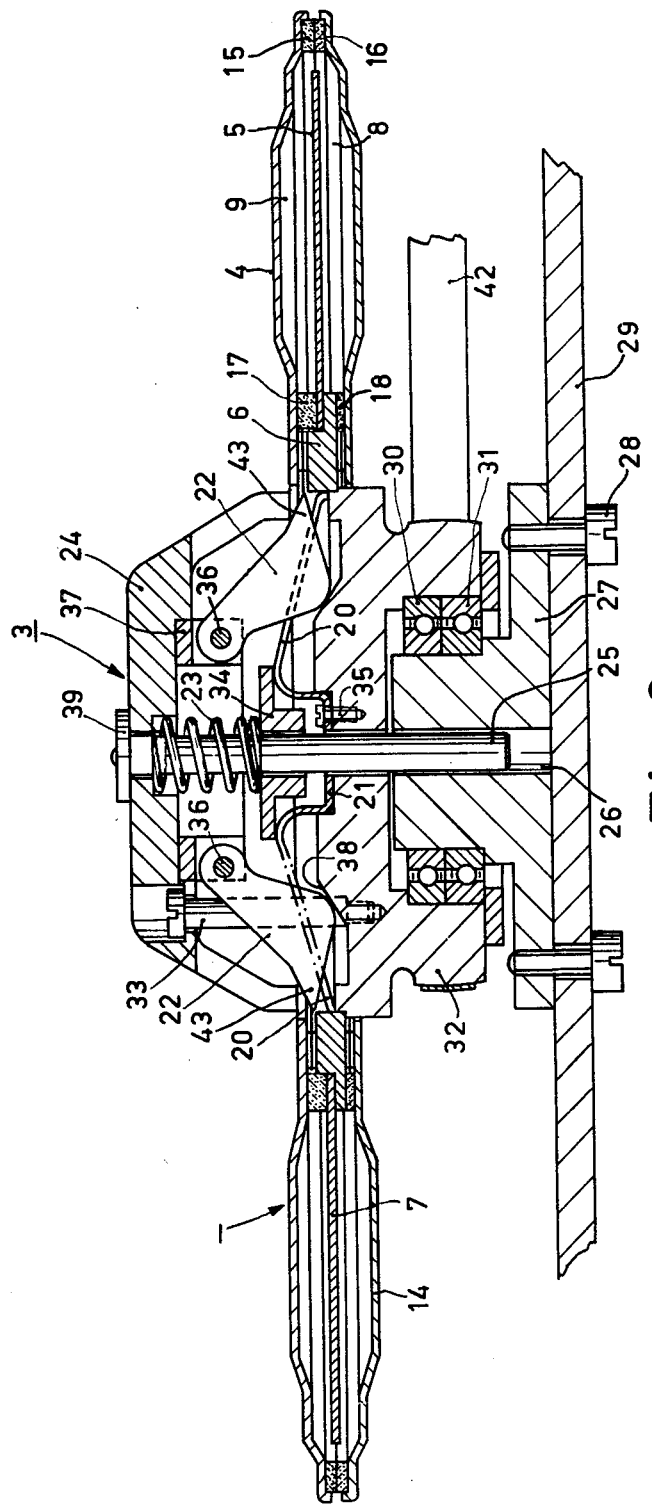
Figure 3:
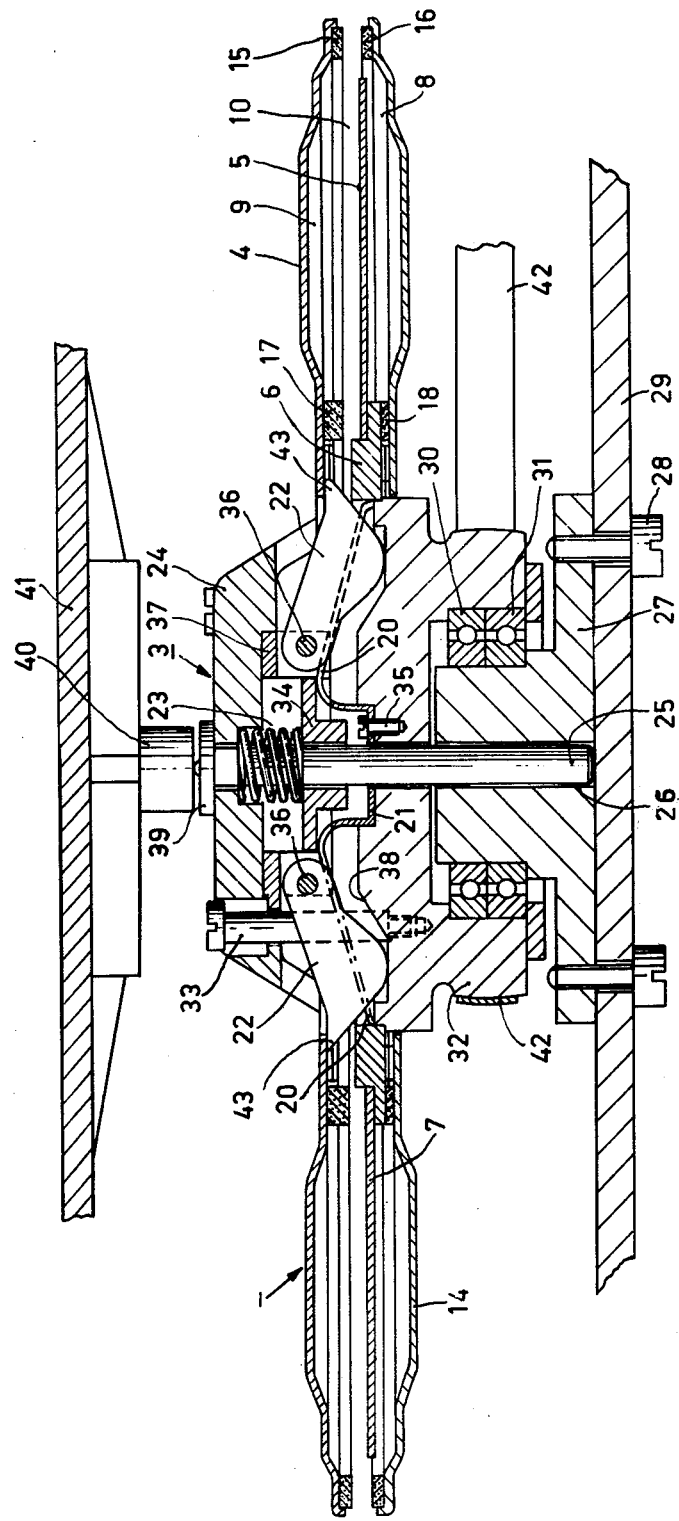
Figure 4:
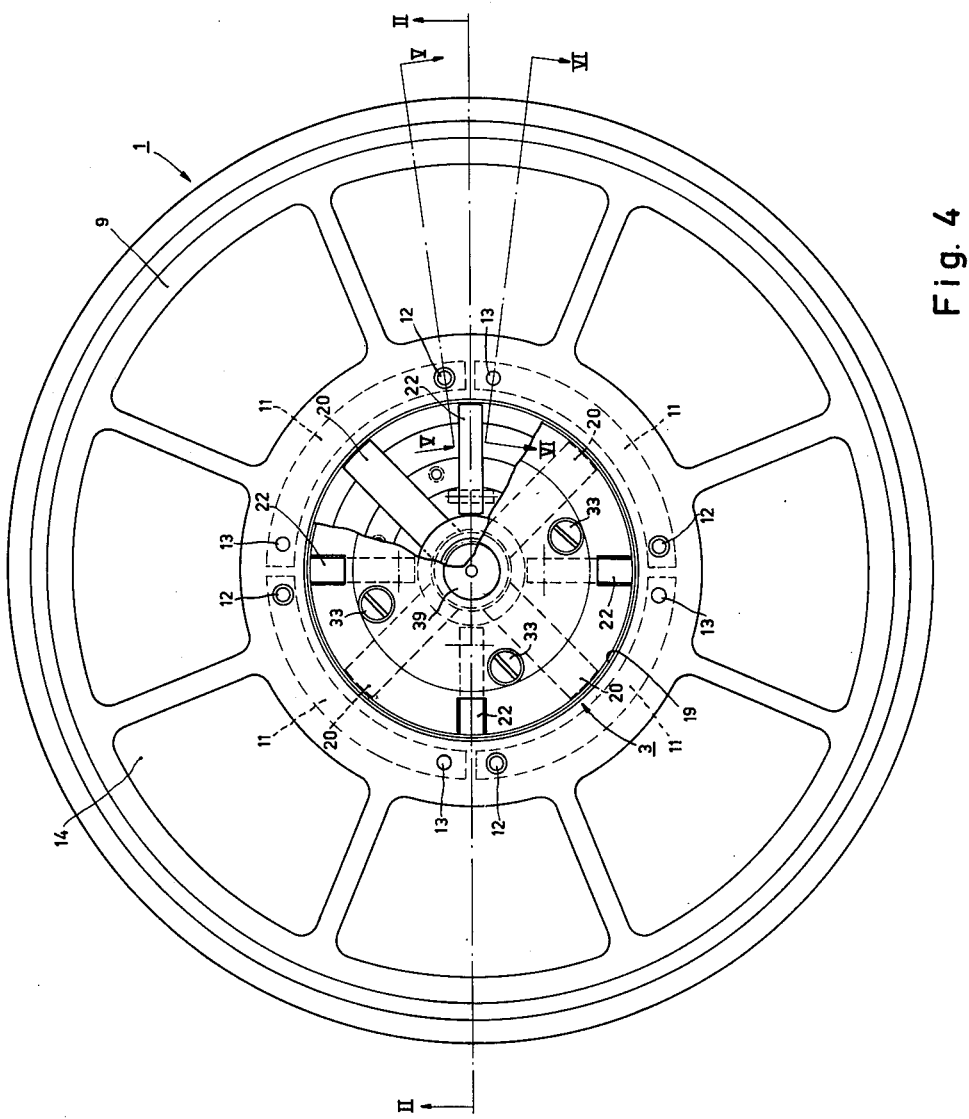
Figure 5:
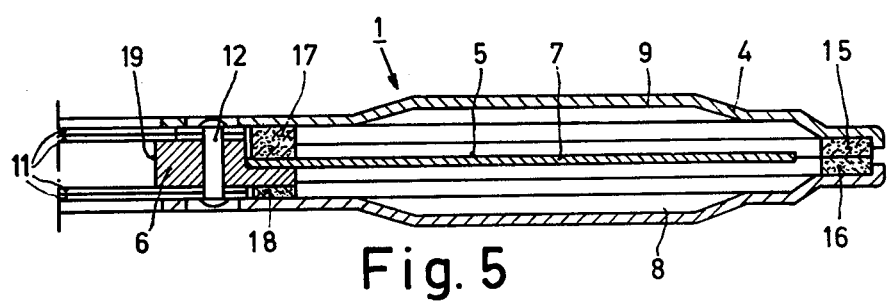
Figure 6:
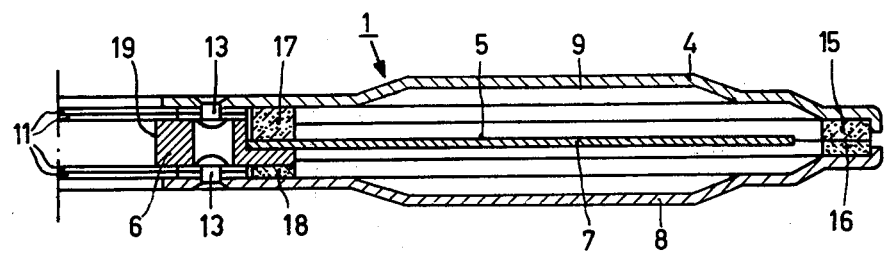

The invention will now be described in more detail with reference to the drawings, which relates to an embodiment of a magnetic storage element and a drive means associated therewith according to the invention, and in which:

FIG. 1 is a perspective view of a drive means with open cover and an associated magnetic storage element which is not yet fitted on the drive spindle of the means, FIG. 2 shows a scaled-up cross-section across the drive spindle of a part of the drive means of FIG. 1, as shown by the arrows II—II in FIG. 4, the storage element being disposed on the spindle, FIG. 3 shows a similar cross-section to that of FIG. 2, but now with the drive spindle and the storage element in the positions which they assume when the cover is closed, FIG. 4 is a plan view of the drive spindle and the storage element of FIG. 2, FIG. 5 is a cross-section in accordance with the arrows V—V in FIG. 2, and FIG. 6 is a cross-section in accordance with the arrows VI—VI in FIG. 4.

In the Figures corresponding parts bear corresponding reference numerals. In FIG. 1 the magnetic storage element is designated by the general reference numeral 1 and the drive means by the general reference numeral 2. The drive means comprises a drive spindle 3 onto which the storage element 1 can be fitted.

The magnetic storage element 1 comprises a substantially cylindrical dust-proof enclosure 4 which accommodates the magnetic disk 5 which can be driven rotatably by the drive spindle 3 as shown in FIG. 2. This disk comprises a hub 6 whose dimensions are such that it cooperates with the spindle 3 in such a way that the disk is consequently positioned on the spindle, and furthermore comprises a thin round plate 7 made of aluminium on which a thin magnetizable coating of for example iron-oxide, cobalt-nickel or the like is provided. The hub 6 and the plate 7 are rigidly connected to each other, for example by bonding or with the aid of other suitable means.

The enclosure 4 comprises two upper and lower covers 8 and 9 which are axially movable relative to each other. In the case of a relative axial movement between the lower and the upper cover, see FIG. 3, a passage is obtained for the magnetic recording and/or read means, not shown, which passage takes the form of an annular slot 10. Each time the storage element 1 is removed from the drive means 2, the annular slot 10 is automatically closed by means of a number of leaf springs 11 which are bent out of their neutral positions and which are thus predetermined, which springs nearer the centre of the storage element 1 are both rigidly connected to the magnetic disk 5, i.e. to the hub 6 thereof, and to the covers 8 and 9, and press these covers towards each other. For the fixation of the leaf springs 11 rivets 12 and 13 may be employed, in the manner shown in the drawing. The leaf springs 11 also serve to prevent a rotation of the magnetic disk 5 relative to the enclosure 4 both when the storage element 1 is removed from the drive means 2 and when said element is disposed on the drive means.

The covers 8 and 9 are identical shells made of a plastic by a vacuum-forming method. They can be made of a comparatively thin material and be provided with local ridges 14 for reinforcement. Near their circumference they comprise annular dust-seals 15 and 16 which when the enclosure is closed engage with each other, see FIG. 2. Nearer the centre smaller annular dust-seals 17 and 18 are disposed, which when the enclosure is closed engage with the magnetic disk 5. The seals are made of a suitable material, several materials suitable for this purpose being known in the present state of the art, which can be glued to the plastic covers 8 and 9 and which furthermore are sufficiently deformable to provide sealing over the whole length, even when the shapes of the various components of the storage element 2 deviate slightly.

The inner surface 19 of the hub 6 which faces the center of the storage element 2 has a continuous cylindrical shape. It is evident that such a shape can be manufactured very easily and thus contributes to a low price for the storage element 2. Furthermore, the advantage is obtained that the storage element can be fitted onto the drive spindle 3 in any arbitrary position, because the co-operation between the spindle and the inner circumference 19 of the hub 9 is not restricted to a specific position of these components relative to each other. The drive spindle 3 is provided with a number of movable clamping members 20 which consist of the arms of a four-arm spring 21 which is made of a resilient sheet material. The clamping members 20 serve for tightly retaining and thus driving the magnetic disk. A number of movable lifting members 22 serve for slightly lifting one of the covers in an axial direction, in this drawing this is the cover 9. At its top side the drive spindle 3 comprises a pressure member 24 which is axially movable against the pressure of a spring 23. In the center of this pressure member 24 a guide pin 25 is secured, which is lodged in a bore 26 of a stationary part 27 of the drive spindle 3, which is secured to a frame plate 29 of the drive means with bolts 28. With the aid of two ball-bearings 30 and 31 a pulley 33 is rotatably journalled relative to the stationary part 27. The pressure member 24 is secured to the upper part of the pulley 32 with the aid of four bolts 33. The bolts prevent the pressure member 24 from being pressed up beyond the position shown in FIG. 2 by the spring 23, yet allowing a depression of the pressure member 24. The pressure spring 23 bears on a spring cup 34, which in its turn presses on the central portion of the spring 21. Said spring 21 is locked against rotation relative to the pulley 32 with the aid of a bolt 35. The lifting members 22 are rigidly connected to the pressure member 24 by means of pivots 36 via an intermediate part 37. In FIG. 2 the lifting members 22 bear on a conical surface 38 of the pulley 32 by their weight. At its top side the pressure member 24 comprises a pivot member 39, which is adapted to cooperate with a corresponding pivot member 40 of a cover 41 of the drive means 2. The drive spindle 3 is driven with the aid of a flat belt 42 by a drive motor, not shown.

Cooperation between the storage element 1 and the drive means 2 is obtained as follows. When cover 41 is open, the drive spindle 3 not being driven, a storage element 1 is fitted onto the spindle 3. The storage element 1 is then positioned relative to the spindle 3 by cooperation of the hub 6 with the upper side of the pulley 32. The position in which the storage element 1 is fitted onto the drive spindle 3 is irrelevant for correct operation, while it is neither of importance whether cover 8 or the cover 9 faces upwards. It is obvious that said covers may be provided with indication means to identify the two sides, while it is also possible to use different colors. By moving the cover 41 from its open to its closed position, the pivot member 40 provided on the cover presses on the pivot member 39 of the drive spindle 3. As a result, the pressure member 24 is moved downwards against the pressure of the spring 23. As a result of this, the clamping members 20 and the lifting members 22 are moved. The movement of the clamping member 20 is caused by the spring cup 34 which presses on the spring 21, so that the clamping members are slightly moved in a radial direction and their ends are clamped against the inner surface 19 of the hub 6. Moreover, the hub 6 is loaded in a downward direction, so that the storage element 1 is firmly seated on the drive spindle and can thus be rotated. The movement of the lifting members 22 is obtained in that via the intermediate part 37 the pivots are moved in a downward direction. As a result, the lower surfaces of the lifting members 22 are moved along the conical surface 38, as a result of which the lifting members pivot slightly about their pivots 36 and their ends 43 move to the position shown in FIG. 3. During the movement of the lifting members 22 from their position shown in FIG. 2 to their position shown in FIG. 3, said ends 43 contact the upper cover 9 and lift said cover to the position shown in FIG. 3, against the pre-tensioning force of the leaf springs 11. As a result of this, the slot-shaped passage 10 is opened, through which the electromagnetic recording and/or reproducing means can enter. After being used, said electromagnetic means are withdrawn again, after which, when the drive spindle 3 has been brought to a standstill, the situation of FIG. 3 is restored owing to the cover 41 being opened, and the storage element can be removed from the drive spindle. The pressure member 24 is slightly conical and rounded at its top so as to facilitate positioning of the storage element onto the spindle. The large diameter of the bore in the hub 6 of the magnetic disk and the shape of the drive spindle, which is such as to cause a high degree of self-centering of the disk, render the operation of fitting the storage element onto the spindle even simpler than putting on a gramophone record.

What is claimed is:

1. An interchangeable random-access magnetic storage element adapted to be fitted onto a drive spindle of a drive means for driving said storage element and comprising:
    a. a substantially cylindrical dust-proof enclosure with a lower and an upper surface disposed at some distance from each other,
    b. a single magnetic disk accommodated in the enclosure, which disk is rotatably drivable by the drive means,
    c. means for positioning the storage element on the drive means,
    d. a passage through which electromagnetic recording and read means can be passed,
    e. means for automatically closing the passage each time that the storage element is removed from the drive means,
    f. means for preventing a rotation of the magnetic disk relative to the enclosure each time that the storage element is removed from the drive means,
    g. the enclosure comprising lower and upper covers which are axially movable relative to each other,
    h. the passage for the magnetic recording and read means having an annular slot which is formed upon a relative axial movement between the lower and upper cover, and
    i. means for preventing a rotation of the magnetic disk relative to the enclosure each time that the storage element is fitted onto the drive means so that the enclosure and the magnetic disk are jointly drivable in a rotatable fashion by the drive means.

2. A magnetic storage element as claimed in claim 1, characterized in that the covers are identical shells made of a plastic.

3. A magnetic storage element as claimed in claim 1, characterized in that the covers near their circumference comprise first annular dust seals, which when the enclosure is closed engage with each other, and furthermore nearer their center are provided with second annular dust seals which when the enclosure is closed engage with the magnetic disk.

4. A magnetic storage element as claimed in claim 1, characterized in that said means for closing the passage for the electromagnetic recording and read means comprise a number of leaf springs which are bent out of their neutral positions, which nearer the center of the storage element are both rigidly connected to the magnetic disk and to a cover and press these covers toward each other.

5. A magnetic storage element as claimed in claim 1, the magnetic disk comprising a round disk which is provided with a magnetizable coating, which disk is rigidly connected to a hub which is adapted to cooperate with the drive spindle of the drive means, characterized in that the inner surface of the hub which faces the center of the storage element has a substantially continuous cylindrical shape.

6. In combination with the magnetic storage element of claim 1, a drive spindle which comprises a number of movable clamping members for tightly retaining and thus driving the magnetic disk and a number of movable lifting members for axially lifting the upper cover.

7. A combination as in claim 6, wherein said drive spindle at its top comprises a pressure member which is axially depressable against spring pressure, which member upon depression moves said clamping members and lifting members, and furthermore the drive means comprises a cover which is movable between an open and a closed position, and a pressure member, the depression of said pressure member being effected by means of parts of the cover which cooperate with the pressure member, when the cover is moved from the open position to the closed position.

* * * * *

UNITED STATES PATENT AND TRADEMARK OFFICE
CERTIFICATE OF CORRECTION

PATENT NO. : 4068271
DATED : January 10, 1978
INVENTOR(S) : CORNELIS HENDRIK KOK It is certified that error appears in the above-identified patent and that said Letters Patent are hereby corrected as shown below:

Column 3, line 32, "predetermined" should read

-- pretensioned --.

Signed and Sealed this

Twenty-third Day of May 1978

[SEAL]

Attest:

RUTH C. MASON
Attesting Officer

LUTRELLE F. PARKER
Acting Commissioner of Patents and Trademarks